United States Patent [19]

Linnepe

[11] 4,083,530
[45] Apr. 11, 1978

[54] ELONGATABLE TELESCOPING SUPPORT

[76] Inventor: Kurt Linnepe, Ronselstrasse 12, Hagen 1, Germany, 5800

[21] Appl. No.: 808,955

[22] Filed: Jun. 22, 1977

[30] Foreign Application Priority Data

Jul. 7, 1976 Germany .............................. 2630446

[51] Int. Cl.² ............................................... B66F 3/02
[52] U.S. Cl. .................................. 254/95; 254/133 A
[58] Field of Search ................................... 254/95–97, 254/133 A; 248/354 R, 354 S

[56] References Cited

U.S. PATENT DOCUMENTS

| | | | |
|---|---|---|---|
| 1,853,155 | 4/1932 | Van Dyken | 254/95 |
| 2,655,862 | 10/1953 | Mitnick | 254/95 |
| 3,583,743 | 6/1971 | Newell | 248/354 S |

*Primary Examiner*—Robert C. Watson
*Attorney, Agent, or Firm*—Karl F. Ross

[57] ABSTRACT

An elongatable telescoping support, e.g. for use as a vehicle jack, comprises an outer prismatic tubular support and an inner prismatic tubular support telescopingly received in the outer support. A head is formed at the mouth of the outer support bar and has a guide surface inclined toward the outer support bar upon which a guide roller is shiftable. The guide roller is formed with a profiled portion adapted to grip a running surface of the inner support bar upon rotation of the guide roller to displace the inner bar out of the outer bar. According to the invention, rings at the end of the roller are received in the inclined windows which are formed in opposite walls of the prismatic head and a guide element is pivoted on this head and is urged, e.g. by a spring, in a direction tending to bias the roller inwardly and toward the outer support or bar. The guide element can be formed of a double-arm lever which can be actuated against the force of the spring to release the contoured portion of the roller from the running surface of the inner support bar and lift the roller along the surfaces of the guide slots to permit inward telescoping of the inner support member.

10 Claims, 3 Drawing Figures

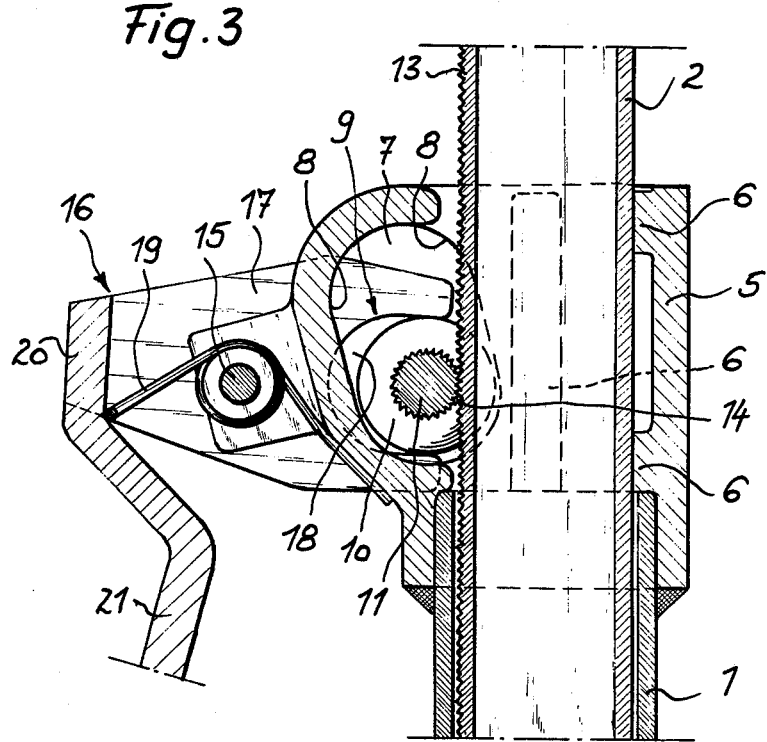
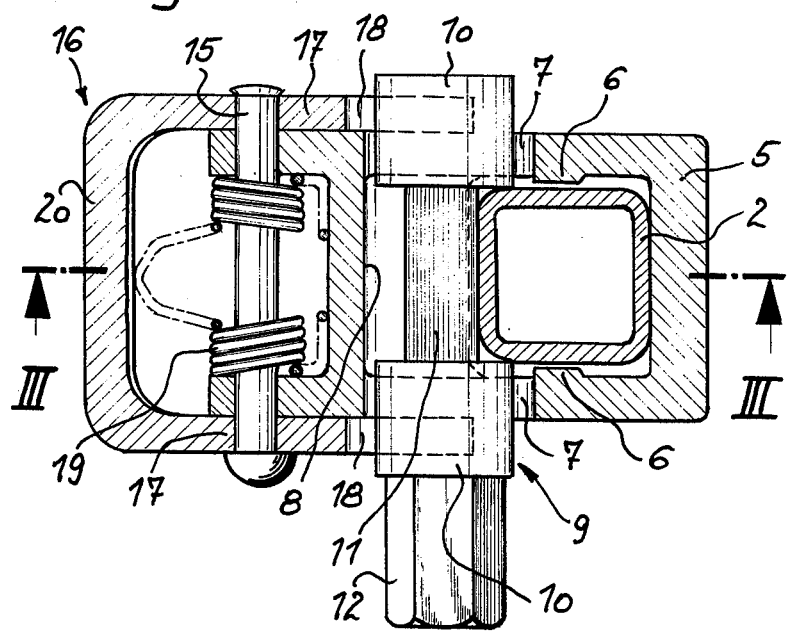

ELONGATABLE TELESCOPING SUPPORT

FIELD OF THE INVENTION

The present invention relates to a telescoping support and, more particularly, to a vehicle jack, prop or other structure in which a pair of elongated telescopingly engageable members can be relatively displaced to elongate or contract the structure.

BACKGROUND OF THE INVENTION

For many purposes and particularly in association with automotive vehicles, it is desirable to provide an elongatable or contractable telescoping support having an inner bar received in an outer bar and displaceable relatively thereto to extend or contract the support. Such devices may be used, for example, as vehicle jacks or props, for support legs for semitrailers and in like applications. The principle, however, also has application wherever extendable supports are required, e.g. as construction jacks, spreading jacks or simply as elongatable structural members, pedestals and the like.

It is known to provide mechanical elongatable telescoping supports of the aforedescribed type and for the aforedescribed purpose which can comprise a support tube, a bar telescopingly received in the support tube and, at the mouth of the support tube from which the bar emerges, a so-called actuating head in which a drive roller is journaled.

The drive roller has a continuous surface which may be ribbed, milled or toothed for engagement with a running surface of the bar so that, upon rotation of this roller, the bar is extended out of the support tube. The bar may be formed with a complementary array of teeth or the like which mesh with the teeth or the roller in rack-and-pinion fashion.

The head can be provided with a guide surface for the roller so that, upon loading of the bar, actuation of the roller causes a reaction force which wedges the roller against the bar and effectively brings about a form-fitting engagement of the running surface of the bar and the roller which is guided toward the bar by the inclined running surface of the head.

In an extensible support of this type, the drive roller is held by its weight, i.e. by gravitational force, between the two converging running surfaces, i.e. is urged in the direction of convergence, so that elongation of the support by withdrawal of the bar from the support tube is facilitated while contraction of the support under load is resisted. To permit contraction of the support after the load has been removed, the roller must be lifted along the guide surface of the head.

A disadvantage of this system, however, has been found to reside in the fact that, upon rotation of the drive roller with a load applied to the bar, forces are generated which tend to tilt or cant the drive roller along the aforementioned running surfaces.

The teeth of the drive roller thus tend to bite into fresh surfaces of the running flank or face of the bar, i.e. tend to penetrate the bar in a manner which deviates from the orientation of the teeth of the latter or at locations other than where the teeth on the bar rack are provided, thereby reducing the reliability of the support and eventually damaging the rack surface of the bar.

OBJECT OF THE INVENTION

It is the object of the present invention to provide an elongatable support whereby this disadvantage is obviated or reduced.

SUMMARY OF THE INVENTION

This object and others which will become apparent hereinafter are attained, in accordance with the present invention, in an extensible support of the aforedescribed type which has a support tube, a bar telescopingly received in this tube, and a head at the mouth of this support tube from which the bar emerges. According to the invention, however, a guide member is swingably mounted on the head and thus is vertically displaceable relative to the support tube while the head is formed with a pair of spaced-apart opposite sides each provided with an elongated slot (guide slot) extending transversely to the length of the bar and each receiving an end portion of the drive roller. According to an essential feature of the invention, means is provided, apart from gravitational force, to bias this guide member in a direction causing the same to urge the roller toward the convergence point of the running surface of the bar and the guide surfaces formed by these slots.

According to a feature of the invention, the guide member is formed as a fork, the legs of which flank the sides of the head, the fork being swingable about an axis extending parallel to the web connecting the arms of the fork and to the roller axis but orthogonal to the axis of the support tube, i.e. at right angles to the longitudinal direction of the support tube and the bar.

Each of the arms of the fork is in turn formed with a guide slot receiving a respective end portion of the roller so that at least one of the flanks of each of these latter slots in the arms bears upon each of the end portions to urge the roller toward the convergence point.

Advantageously, moreover, a torsion spring is provided to bias the fork in the manner described, the torsion spring bearing against the head, on the one hand, and the fork on the other hand. The torsion spring can extend around the pivot of the fork.

According to another feature of the invention, the guide member is provided as a double arm lever, the arms of the fork constituting one arm and the lever having a further arm, longer than the first-mentioned arm, which projects away from the support tube but which can be manually actuated to lift the roller along its running surfaces.

According to yet another feature of the invention, the roller is formed with teeth over an axial length which is equal to the width of the running surface of the bar parallel to the roller axis. In other words, the teeth of the roller extend at least over the full width of the running surface. Best results are obtained when the toothed portion of the roller is flanked between the end portions mentioned previously and these end portions are a larger diameter than the toothed portions so that they form shoulders between which the bar is guided.

The support of the present invention thus can be extended elongated under load in a stepless manner while preventing tilting of the drive roller. Consequently, the drive roller does not impress new formations in the bar and a perfect mesh of the pinion constituted by the toothed portion of the drive roller, and the rack constituted by the guide surface of the bar is ensured. The support is, furthermore, usable independently of its orientation since it does not rely upon gravitational forces.

Brief Description of the Drawing

The above and other objects, features and advantages of the present invention will become more readily apparent from the following description, reference being made to the accompanying drawing in which:

FIG. 2 is a cross-sectional view taken along the line II — II of FIG. 1; and

FIG. 3 is a cross-sectional view taken along the line III — III of FIG. 2.

SPECIFIC DESCRIPTION

Figure 1:
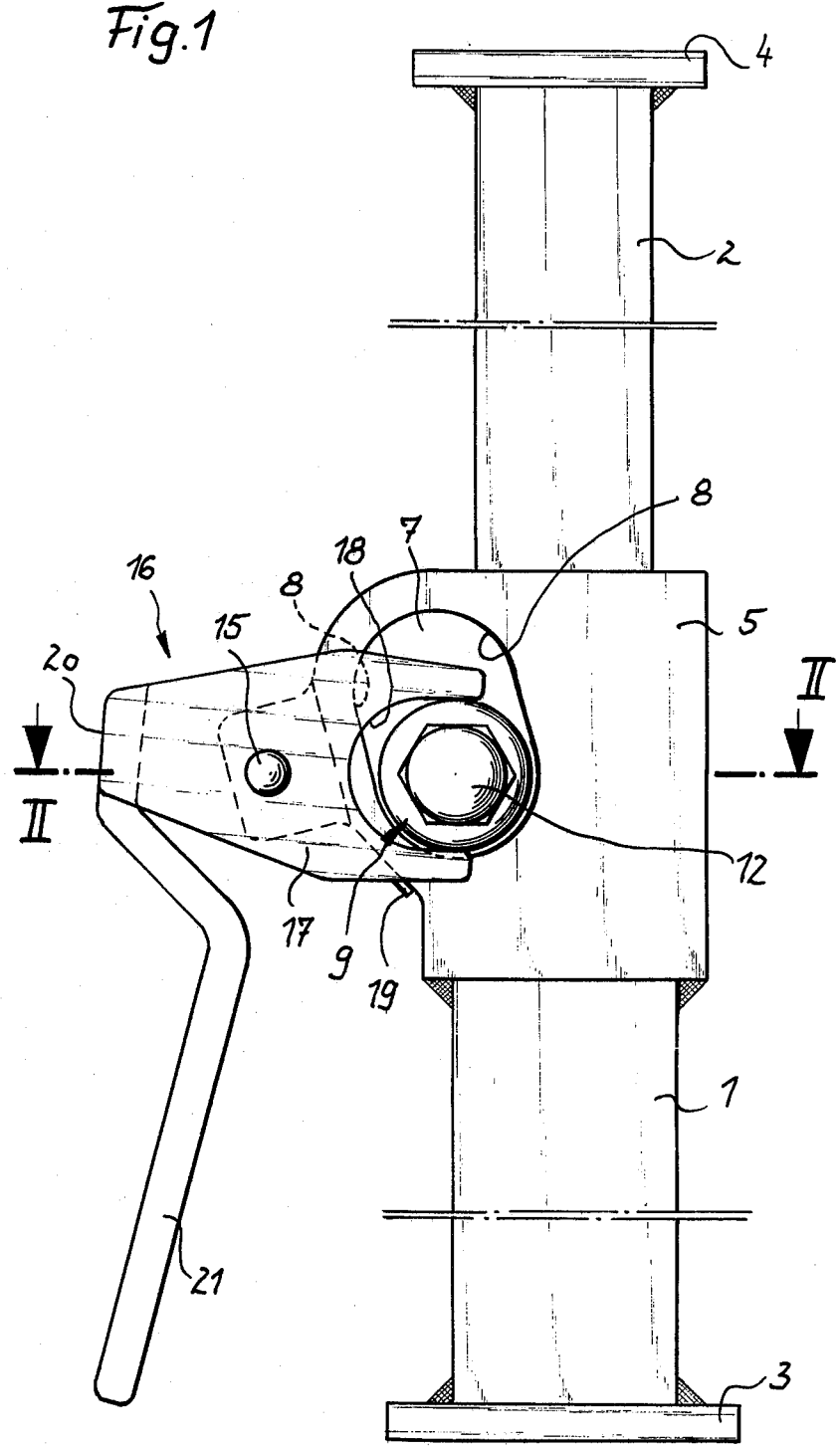
FIG. 1 is a front elevational view of a support structure in accordance with the present invention.

The support illustrated in the drawing comprises a square-cross-section support tube 1 composed of metal, e.g. steel, and receives a steplessly adjustable bar which is telescopingly fitted into one end of the support tube 1 and is removable therefrom. The bar 2 is also of square cross section and of tubular construction, being composed, for example, of steel.

At the opposite ends of the support tube 1 and the bar 2 support plates 3 and 4, respectively, are welded onto the support tube 1 and the bar 2.

The mouth of the support tube 1 from which the bar 2 emerges is provided with a head 5 which can be cast in iron or steel and which has at its lower end, a square-cross-section socket into which the upper end of the support tube 1 is form-fitted, the head being welded to the support tube 1. In other words, the upper end of the support tube 1 is nonreleasably fixed to the head 5.

The head 5 is provided with unitary small ribs 6 forming guide ribs which slidably receive the bar 2 and prevent lateral displacement thereof in any direction.

A pair of opposite walls of the head 5 are formed with windows 7 having inclined guide surfaces 8 which converge inwardly toward the support tube 1 and hence converge towards the running surface 13 of the bar 2. In the orientation of the support illustrated in the drawing, the running surfaces 8 of the windows 7 converge downwardly toward the axis of the support.

Within the windows 7, a drive roller 9 is disposed. The drive roller 9 is formed by opposite sides of a toothed roller portion 11 or pinion, with smooth-surfaced guide rings 10 of a diameter substantially corresponding to the width of the respective window in which each ring 10 is received. The rings 10 have larger diameters than the pinion 11.

Because of these large diameters, the rings 10 form shoulders receiving the flanks of the bar 2 between them as is best seen in FIG. 2. As a result, the drive roller 9 is axially fixed.

An extremity of the drive roller 9 projecting beyond one of the rings 10 is formed with a polygonal head 12 engageable by a key or other tool for operating the support. Preferably the tool is a handcrank form-fitting over the polygonal head 12 although any other key or tool may be used if it is capable of rotating the roller 9. A screw key, for example, has been found to be suitable.

The toothed, corrugated or otherwise contoured pinion or roller section 11 is hardened so that it has a hardness greater than the running surface 13 of the bar 2. This ensures that, when the bar 2 is under load, the contours of the drive roller 9 will bite or grip frimly in the teeth 14 of the bar 2.

The head 5 is provided with a pintle which defines a pivot axis 15 for guide member 16 which is formed as a fork. In the arms or shanks 17 of this fork, which straddle the walls of the head 5 provided with the windows 7, are provided respective guide slots 18.

The latter may be open toward the ends of the shanks so that each of the shanks or arms is in turn bifurcated with the legs of the bifurcation straddling a respective ring 10 in the region in which such ring projects beyond the lateral wall of the head 5.

In other words, the guide slots 18 formfittingly engage the guide rings 10 of the drive roller 9.

On the pintle defining the axis 15, there is provided a torsion spring 19, also termed a shank spring, which is under prestress and thus biases the arms 17 downwardly, thereby pressing the drive roller 9 continuously against the running surface 13 of the bar 2. The torsion spring 19 can have one leg lying against the bight or web of the fork 16 while another leg rests against the head 5.

To release the engagement of the drive roller 9 with the bar 2, the web 20 of the fork is extended into a handle 21 so that the guide member 16 is thereby constituted as a double-arm lever.

In operation, before the loading of the support, the latter is positioned as required and, while the support tube 1 is held down, the bar can be raised notwithstanding the downward bias on the roller 9 by the spring 19 and the lever 16. When the bar 2 from the support tube 1, thereby placing the structure under load. The load acts in the same direction as the spring bias and wedges the roller so that the load cannot drop. To release the support, it is merely necessary to swing the arm 21 in the counterclockwise sense (FIG. 3) to lift the roller 9 slightly and thereby break the wedging action and permit the bar 2 to fall.

I claim:

1. An extensible and contractable support comprising:

an elongated support tube;

a bar telescopingly received in said support tube and adapted to extend out of a mouth of said support tube;

a head fixed to said support tube at said mouth and formed with at least one running surface inclined inwardly toward said support tube in a direction opposite that in which said bar is adapted to be withdrawn from said support tube to elongate the structure, said bar having a running surface juxtaposed with the running surface of said head, said running surfaces converging in said direction;

a drive roller received in said head and disposed between said running surfaces while having end portions projecting beyond opposite walls of said head, said drive roller being engageable with said running surface of said bar to displace the same out of said support tube upon rotation of said drive roller;

a guide member movably mounted on said head and engaging said end portions; and means bearing upon said guide member for biasing same and said roller in the direction of convergence of said running surfaces.

2. The support defined in claim 1 wherein said member is formed with respective guide slots each receiving a respective end portion of said roller, said slots extending transversely to the longitudinal dimension of said bar, said end portions of said roller being rotatable in said slots.

3. The support defined in claim 2 wherein said member is formed as a fork having a pair of arms straddling said walls of said head and formed with said slots, said fork having a web connecting said arms, said support further comprising means pivotally mounting said member upon said head for rotation about an axis perpendicular to said arms and parallel to said web.

4. The support defined in claim 3 wherein said means biasing said member is a torsion spring disposed along said axis and bearing upon said member and said head.

5. The support defined in claim 4, further comprising a handle on said member for enabling manual actuation thereof to lift said roller between said running surfaces.

6. The support defined in claim 5 wherein said roller is formed with respective rings at said end portions engaging in said slots, and a toothed portion between said rings, said rings having diameters greater than that of said toothed portion, said running surface of said bar being formed as a rack adapted to mesh with said toothed portion.

7. The support defined in claim 6 wherein said support tube is of polygonal cross section and said bar is a tube of polygonal cross section, said rings forming shoulders closely juxtaposed with and receiving between them opposite flanks of said bar.

8. The support defined in claim 7 wherein said walls are formed with respective windows defining said running said surface of said head.

9. The support defined in claim 8 wherein said roller is formed at one end thereof beyond the respective ring with a polygonal head engageable by a crank.

10. The support defined in claim 9 wherein said head is formed with a socket receiving said mouth of said support tube and with ribs engaging and guiding said bar and disposed opposite said roller.

* * * * *